(12) United States Patent
Amro et al.

(10) Patent No.: US 6,542,591 B1
(45) Date of Patent: Apr. 1, 2003

(54) METHOD AND SYSTEM FOR CALLER IDENTIFICATION CALLBACK LISTS

(75) Inventors: Hatim Yousef Amro, Austin, TX (US); George Kraft, IV, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 09/627,030

(22) Filed: Jul. 27, 2000

(51) Int. Cl.[7] .......................... H04M 1/56; H04M 15/06
(52) U.S. Cl. ............................. 379/142.01; 379/142.06; 379/207.15; 379/210.01
(58) Field of Search .......... 379/127.01, 142.01–142.18, 379/164–165, 210.01, 268–269

(56) References Cited

U.S. PATENT DOCUMENTS

| | | | |
|---|---|---|---|
| 3,787,632 A | | 1/1974 | Male et al. ............. 179/18 FH |
| 3,862,374 A | | 1/1975 | Evers .................... 179/18 FH |
| 5,398,279 A | * | 3/1995 | Frain |
| 5,734,706 A | | 3/1998 | Windsor et al. ............ 379/142 |
| 5,754,635 A | | 5/1998 | Kim .......................... 379/142 |
| 5,761,289 A | * | 6/1998 | Keshav |
| 6,009,158 A | * | 12/1999 | Romero |
| 6,118,863 A | * | 9/2000 | Komuro et al. |
| 6,154,530 A | * | 11/2000 | Letellier |
| 6,396,906 B1 | * | 5/2002 | Kaplan |

FOREIGN PATENT DOCUMENTS

JP    02000295339 A  * 10/2000

* cited by examiner

*Primary Examiner*—Duc Nguyen
(74) *Attorney, Agent, or Firm*—Duke W. Yee; Casimer K. Salys; Michael R. Nichols

(57) ABSTRACT

A caller identification callback list method and system. The system displays a callback list informing a user of a missed call received from a terminal on a central office telephone line from within an organization. The callback list includes the names and extension or branch telephone numbers for persons the user has defined exist within the organization. Once an indication that the user has missed a telephone call from within the organization appears on the user's terminal, the user may choose from a list of names and extension or branch telephone numbers and return the call without having to search outside sources for the correct number. The return call may be accomplished by either an automatic callback feature or manually using the terminal. Additionally, the caller identification callback lists allow a user to select the people and associated extension or branch telephone numbers in advance without the prospective caller first calling the user.

48 Claims, 8 Drawing Sheets

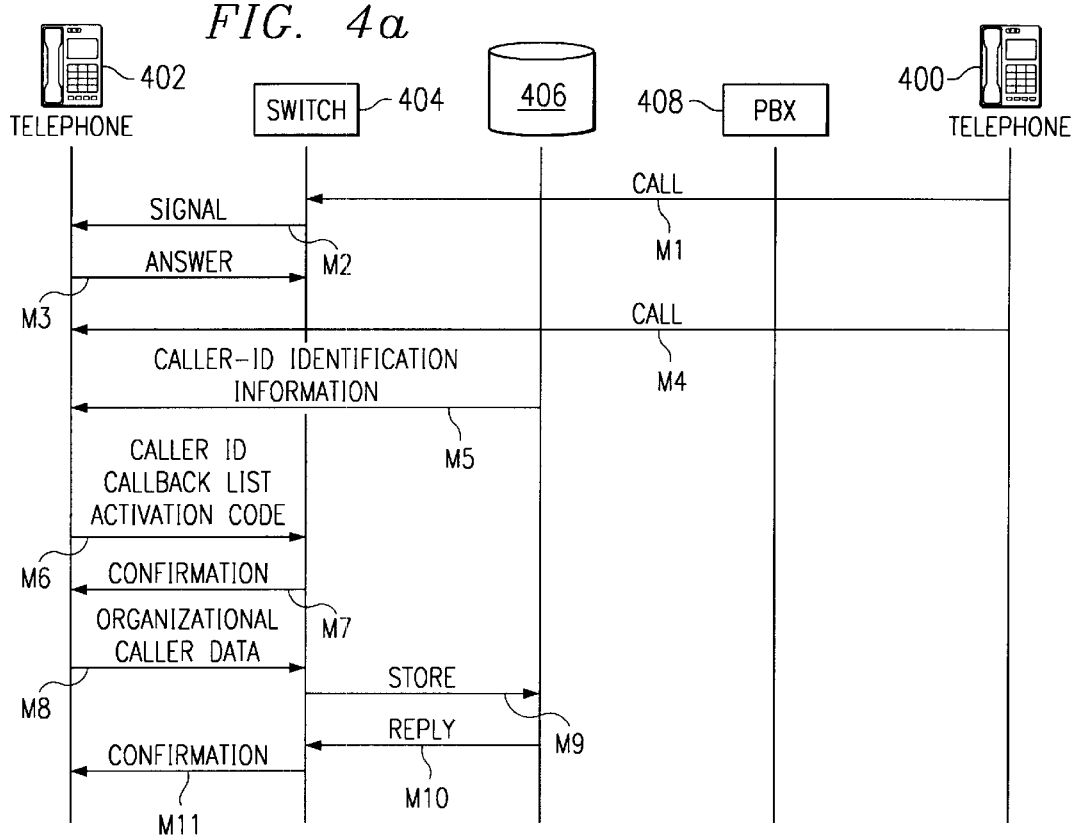
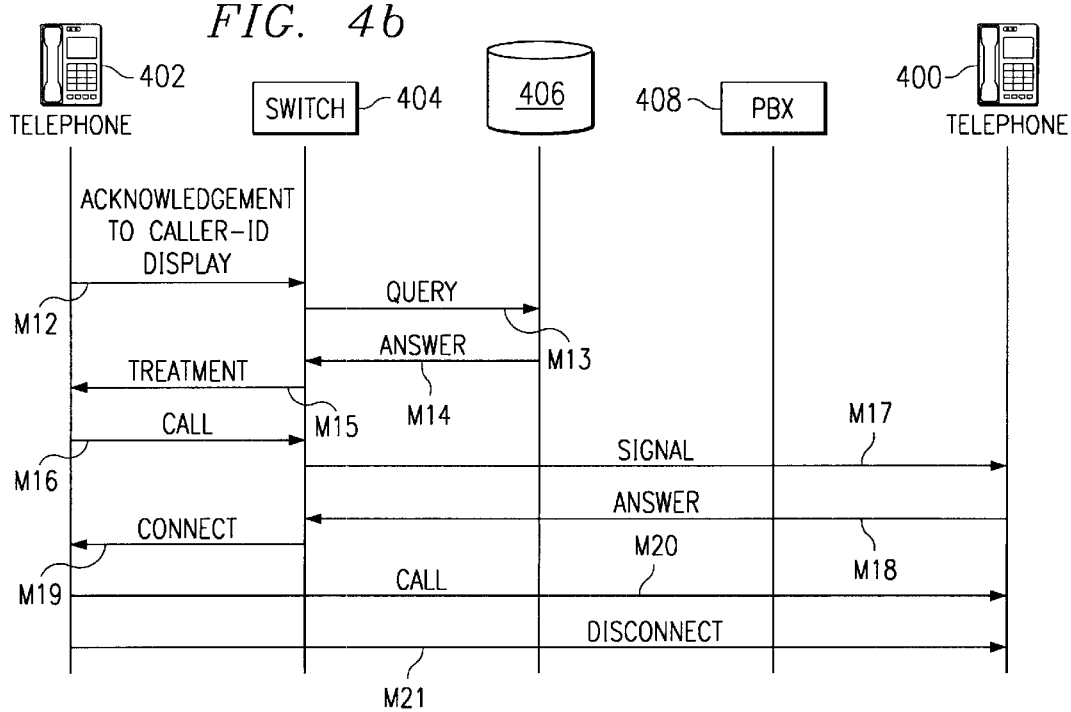

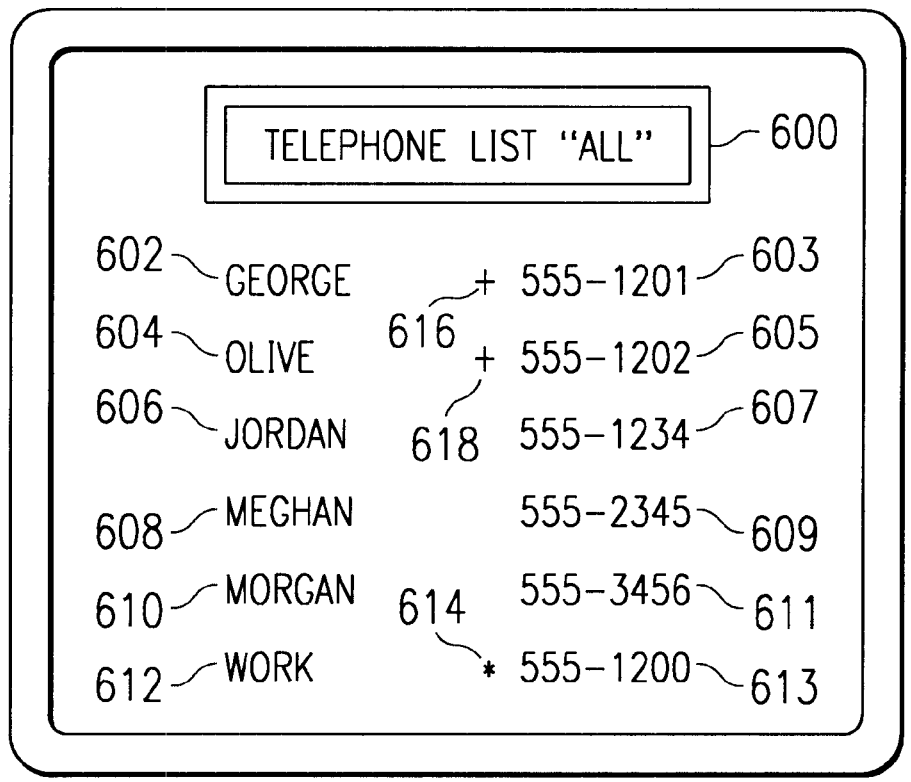
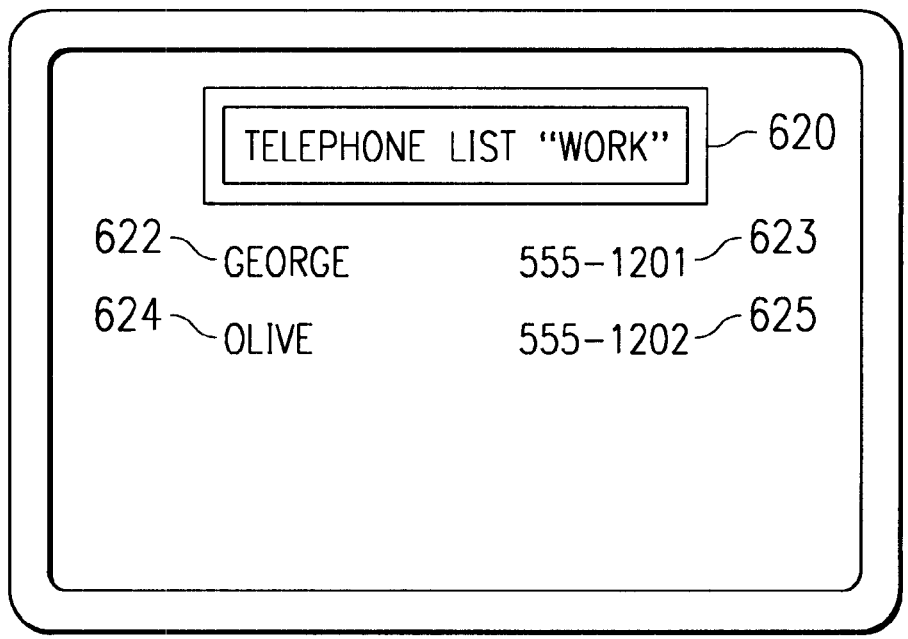
FIG. 6

METHOD AND SYSTEM FOR CALLER IDENTIFICATION CALLBACK LISTS

BACKGROUND OF THE INVENTION

1. Technical Field

The present invention relates generally to an improved communications system, and in particular, to a method and system for improved caller identification. Still more particularly, the present invention relates to a method and system for developing caller identification callback lists for telephone calls originating from extension lines within organizational central office lines.

2. Description of Related Art

Caller-ID can be a helpful tool. When a call is received and caller-ID is activated on the recipient's telephone system, the telephone number from which the call is sent is displayed on the recipient's terminal. The originating telephone number is stored in a database, i.e. the originating central office equipment register. The originating telephone number supports a further database lookup, which associates a directory listing to the stored originating telephone number, assuming the originating number is listed. The name and number information is passed through the local and long distance networks, and appears on the recipient's caller-ID display.

Caller-ID is particularly useful when a call is placed and no one at the recipient number is available to take the call. When the recipient returns, the number is retrieved using the caller-ID feature. Therefore, the loss of the identity of the persons that may leave garbled or erased messages using an answering machine or voice mail or persons who do not leave messages at all, is avoided.

Although a worthwhile feature, caller-ID also has its shortcomings. One of the most prevalent is when a call originates from an organization which has a main telephone line but an array of extensions. When a call is placed from one of these extensions, the caller-ID feature on the recipient's terminal only records and displays the main switch number and the called party has no idea from which extension the called was placed or by whom. The recipient of the call must, in response, dial the main number recorded on the caller-ID display and attempt, using the organizational telephone directory, determine who made the call. The called party must either know with a fair amount of certainty who placed the call or try, by trial and error, to match names of people known by the called party within the organization with the appropriate extension. Either option can be at least frustrating and at most impractical and futile.

In view of the above, it would be advantageous to have a caller-ID system that provides for quick identification of extension or branch telephone numbers from a central office line within an organization.

SUMMARY OF THE INVENTION

The present invention provides a method, system and computer readable instructions for use in a caller-ID callback list system which identifies an extension or branch telephone number of a caller along with the identity of the caller made from within an organization having at least one central office telephone number and more than one extension or branch telephone number. In particular, a subscriber at a recipient terminal may send a signal from the terminal to develop lists for enhanced identification of calls originating from a central office line within an organization.

According to one embodiment of the present invention, a subscriber maintains a list of caller-ID callback groups for extension or branch telephone numbers within an organization. The subscriber programs the terminal caller-ID callback list feature to establish a separate list for each central office telephone number. When a number originating from an identified central office telephone number calls the subscriber, the central office telephone number is displayed according to caller-ID protocol. With the central office telephone number identified, the subscriber may, through the use of subscriber generated lists, select the specific individual from within the list of individuals associated with the central office number to which the responding call should be directed.

Thus, with the present invention, a recipient can return a missed call with a fair amount of certainty even though the called originated from a central office telephone number consisting of multiple extension and/or branch telephone numbers. Other features and advantages of the present invention will be described in, or will become apparent to those of ordinary skill in the art in view of, the following detailed description of the preferred embodiment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4a is an exemplary message flow diagram illustrating activation of a caller-ID callback list feature depicted in accordance with a preferred embodiment of the present invention;

FIG. 4b is an exemplary message flow diagram illustrating processing a call with a caller-ID callback list feature depicted in accordance with a preferred embodiment of the present invention;

FIG. 6 is an exemplary illustration of caller-ID callback lists according to the present invention;

DETAILED DESCRIPTION OF THE PREFERRED EMBODIMENT

Figure 1:
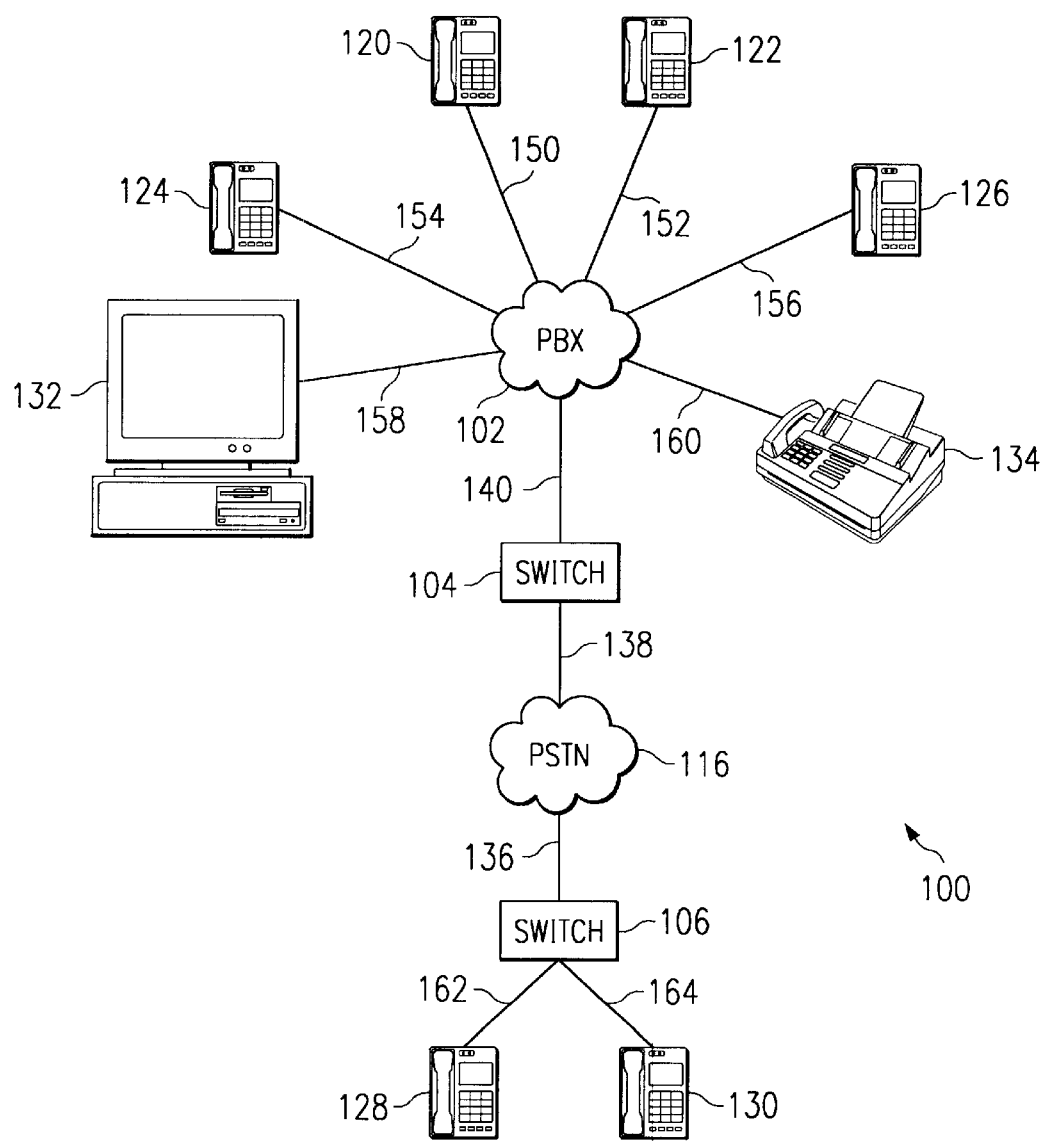
FIG. 1 is an exemplary block diagram of a typical communications system according to the present invention.

With reference now to the figures, FIG. 1 is an exemplary block diagram of a typical communications system according to the present invention. The present invention may be implemented in the various switches depicted in communications system 100 and also in the various telephones or terminals depicted in communications system 100. Communications system 100 includes a public switched telephone network (PSTN) 116, which includes switches 104 and 106. Although depicted as separate from public switched telephone network (PSTN) 116 for illustration purposes, switches 104 and 106 and may actually be part of PSTN 116.

Switch 104 and switch 106, and private branch exchange (PBX) 102 are connected to each other via communications links 136, 138, and 140, which are physical links, such as, for example, coaxial cable, fiber optic cable, and the like. The communications links among switches 104 and 106 may be, for example, T1 lines, E1 lines, and the like. Each switch has a "link", also called a "path", within the switch for routing data through the switch. An "input link" is the input or source portion of the link associated with an input into the switch, and an "output link" is the output or destination portion of the link associated with an output from the switch. In addition, communications links 136, 138, and 140 may be wireless.

Telephones 120, 122, 124, 126, 128 and 130 are connected to their respective switches as shown in FIG. 1, via communications links 150, 152, 154, 156, 162 and 164 which are also physical links that are typically copper twisted pairs but may consist of other types of connections, such as, for example, coaxial cable, fiber optic cable, and the like. In addition, communications links 150–164 may be wireless. For example, wireless connections may be part of PSTN 116.

Data may be sent through a number of different paths using various communications links and switching within PSTN 116. For example, an originating call within PBX 102 at telephone 120 may send information to a user in PSTN 116 through communications link 140 and then through communications link 138. Alternatively, information may reach a user from telephone 120 within PBX 102 by sending data through a path starting with communications link 150, through communications link 140, through communications link 138, through communications link 136, and then through communications link 162, to reach the user at telephone 128. The various switches in PSTN 116 direct traffic between other switches to facilitate flow of information within this communications system. Data also may be transferred between other communications devices, such as computer 132 or facsimile machine 134, within communications system 100 via communication links 158 and 160, respectively.

Those of ordinary skill in the art will appreciate that the hardware depicted in FIG. 1 may vary. For example, other types of communication systems could be used, such as a cellular phones, personal communication services (PCS), cordless phones and the like may be used in addition or in place of the hardware depicted. FIG. 1 is intended as an example, and not as an architectural limitation for the present invention.

Figure 2:
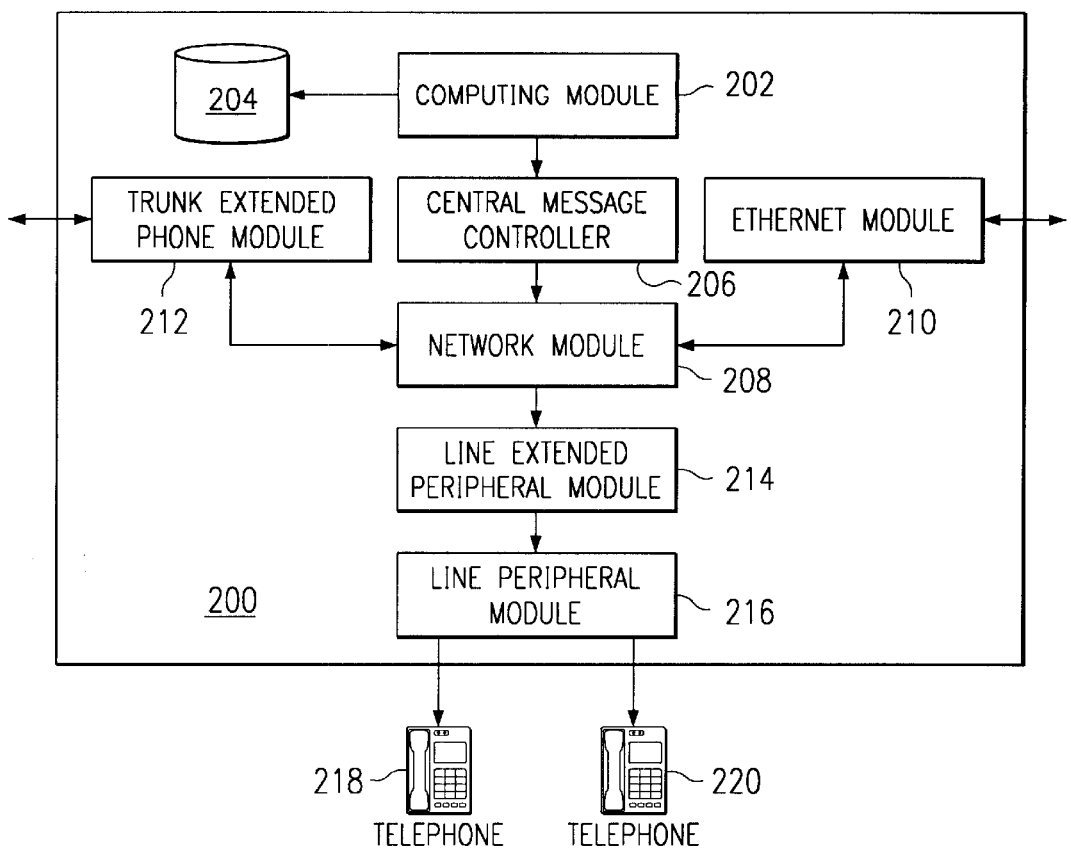
FIG. 2 is an exemplary block diagram of a typical Private Branch Exchange (PBX) switch according to the present invention.

FIG. 2 is an exemplary block diagram of a typical Private Branch Exchange (PBX) switch according to the present invention. PBX switch 200 may be implemented as PBX 102 or switch 104 and 106 in accordance with the present invention. PBX switch 200 is an example of a switch in which the processes of the present invention may be implemented. In some cases, switch 200 may actually be implemented using a switch typically used in PSTN 116. Switch 200 differs from a switch within PSTN 116 in FIG. 1 primarily in its capability to serve lines and process calls. A PBX typically serves fewer than a thousand stations and may process between 50,000 and 100,000 busy hour call attempts. It should be noted that the other PBX switches may include additional or different components from those illustrated in FIG. 2.

In this example, switch 200 includes a computing module 202, a database 204, a central message controller 206, and a network module 208. In the depicted example, database 204 is resident in memory, but other types of databases are possible in alternate embodiments, including remotely located databases, and the like.

Central message controller 206 is connected to computing module 202 and to network module 208, and controls the functions of network module 208 based on instructions received from computing module 202. Computing module 202 handles all call processes of PBX switch 200 including, for example, tracking numbers, switch translation, caller-ID data, and configuration data. Computing module 202 accesses database 204 to access the data necessary to implement these processes. Network module 208 in essence forms a switch fabric for switch 200. However, it should be noted that the switch fabric may include other components not shown. A switch fabric is the internal interconnect architecture used by a switching device, which redirects the data coming in on one of its ports out to another of its ports. Central message controller 206 controls switching of calls within network module 208.

Ethernet module 210 is connected to network module 208 and provides a connection to a local area network. Trunk extended phone module 212 also is connected to network module 208 and provides a connection to a public switch telephone network, such as PSTN 116 in FIG. 1. The trunk is an electronic path over which information is transmitted and, in particular, is a circuit between telephone exchanges for making connections between users.

Further, line extended peripheral module 214 is connected to network module 208. Line extended peripheral module 214 provides an ability to control multiple line peripheral modules, such as line peripheral module 216. Line peripheral module 216 provides a connection to terminal equipment, such as telephones 218 and 220. Each line peripheral module may have multiple phones connected to it.

The caller-ID callback list feature of the present invention may be implemented as software executing on computing module 202. In the depicted example, in response to a subscriber acknowledgement, caller-ID callback list software examines incoming caller line information for a call from an originating terminal and compares caller line identification with a list of directory numbers stored in database 204. If the originating terminal directory number is found in database 204, switch 200 displays a list, the list containing names of individuals which have been previously identified to be placed within a specific list. Otherwise, if the originating directory number is not stored in database 204, switch 200 sends a message indicating the number is not in database 204.

Those of ordinary skill in the art will appreciate that the hardware depicted in FIG. 2 may vary. For example, other types of telephone systems could be used, such as a cellular telephones, personal communication services (PCS), cordless telephones and the like may be used in addition or in place of the hardware depicted. FIG. 2 is intended as an example, and not as an architectural limitation for the present invention.

Figure 3:
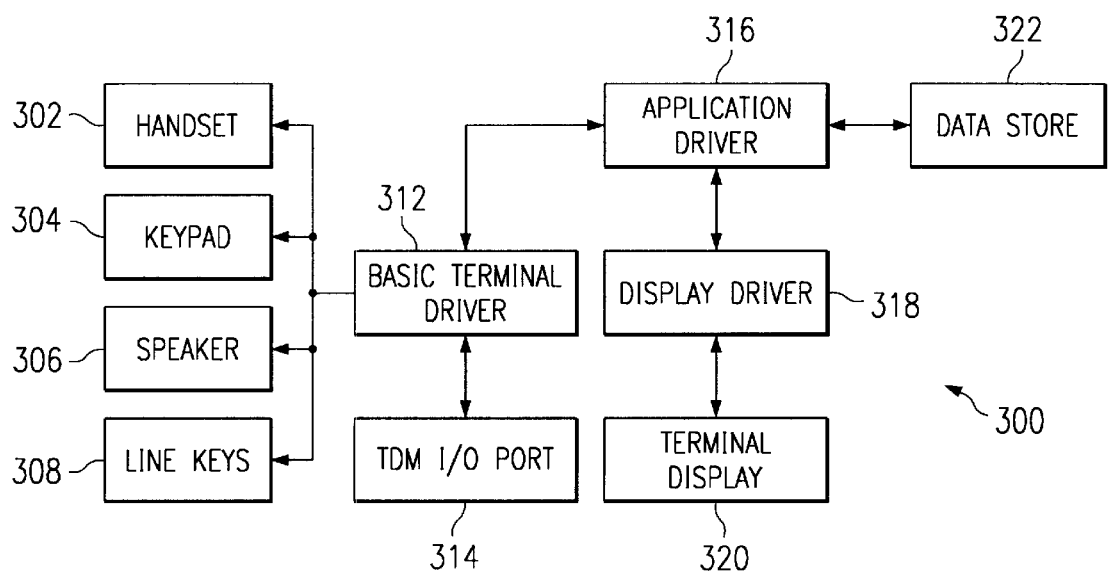
FIG. 3 is an exemplary block diagram of a typical terminal according to the present invention.

FIG. 3 is an exemplary block diagram of a typical terminal according to the present invention. Terminal 300 is an example of a terminal that may be connected to a switch, such as switches 104 and 106, or a PBX, such as PBX 102 illustrated in FIG. 1. Terminal 300 is also referred to as customer premises equipment (CPE). Terminal 300 is, for example, a telephone with a display although other communication equipment could also be used. For example, terminal 300 may be a computer, a Personal Digital Assistant (PDA), and the like.

Terminal 300 in this example is a telephone equipped to send, receive and display text messages, as well as functioning as a telephone, such as telephones 218, and 220 illustrated in FIG. 2. Terminal 300 includes a terminal driver 312, which provides input and output to various parts of terminal 300. In this example, terminal driver 312 is used to control handset 302, keypad 304, speaker 306, and line keys 308. Handset 302 allows a user to speak and hear a caller or called party. Key pad 304 allows a user to enter digits of a telephone number and to enter other information. Speaker 306 allows a user to listen to a caller or called party without the aid of handset 302. Line keys 308 allow a user to select, from multiple phone lines, a line to use.

Terminal driver 312 also has a connection to a time division multiplexed (TDM) input/output (I/O) port 314, which provides a connection to the telephone line. In addition, terminal driver 312 interfaces with application driver 316. Application driver 316 performs all the processes of terminal 300, including instructing display driver 318 to display information and/or messages to the subscriber on terminal display 320. Furthermore, application driver 316 stores data received by terminal 300 in data storage 322, from which this information may be retrieved by application driver 316 for later use. Application driver 316 is used to process various calls and data. In particular, application driver 316 may store information in data store 322. Additionally, application driver 316 may send displays through display driver 318 to display information on terminal display 320. In these examples, terminal display 320 is used to display caller-ID line identification to the user of terminal 300 to alert the user that a call was received and the user was not available to answer the call.

In these examples, terminal driver 312, application driver 316, and display driver 318 represent software or functional modules in terminal 300. The other components depicted are illustrations of physical components within terminal 300 that may be controlled or accessed, by the use of either software of hardware, through these drivers.

Terminal 300 is an example of a terminal or phone on which the processes of the present invention may be implemented. Other terminals or telephones may be used as well, and may include more or fewer components than those shown in FIG. 3.

Those of ordinary skill in the art will appreciate that the hardware depicted in FIG. 3 may vary. For example, terminal 300 may include a liquid crystal display (LCD), a voice prompt, voice recognition, and the like to allow a user to interface with terminal 300 and may be used in addition or in place of the hardware depicted. FIG. 3 is intended as an example, and not as an architectural limitation for the present invention.

FIG. 4a is an exemplary message flow diagram illustrating activation of a caller-ID callback list feature depicted in accordance with a preferred embodiment of the present invention. In a preferred embodiment of the present invention, the subscriber, in response to caller-ID information appearing on the subscriber's terminal 402, may activate the caller-ID callback list feature and select the name and the corresponding extension or branch telephone number of the person who presumably placed the original call. In an alternate embodiment of the present invention, the subscriber at terminal 402 may activate the caller-ID callback list feature and enter the name and the corresponding extension or branch telephone number of a conceivable future caller before a call is received from that caller.

In this example, originating terminal 400 is originating a call to recipient terminal 402 from PBX 408 via switch 404. Originating terminal 400 sends a request to switch 404 to set up a call to telephone 402 (step M1). Switch 404 will use the digits contained in the call from originating terminal 400 to identify the call destination. Switch 404 signals recipient terminal 402 (step M2). An answer is received by switch 404 from recipient terminal 402 (step M3). The call is then connected between originating terminal 400 and recipient terminal 402 (step M4). The caller line identification (CLID) of the originating caller is sent to terminal 402 (step M5). The caller line identification may include the caller's name, phone number, or other identifying information.

Next, switch 404 may receive a feature activation code from terminal 402 (step M6). This feature activation may be, for example, a subscriber lifting the handset on terminal 402 and entering a combination of keypad keystrokes, for example "99#", which generates the appropriate dual tone multi-frequency (DTMF) signals recognized by switch 404. Of course, other mechanisms may be used to activate the feature. For example, the subscriber may, if a telephone number is known before a call from a central office telephone number is placed, enter the name and the corresponding extension or branch telephone number to the appropriate list. In response, switch 404 sends a confirmation to recipient terminal 402 that the feature has been activated (step M7). This confirmation may be, for example, a tone or voice message.

Organizational caller data is entered through terminal 402 via switch 404 to store on database 406 (step M8). Switch 404 stores the subscriber defined caller-ID identification information for recipient terminal 402 in database 406, which may be a local or remote database to switch 404 (step M9). In response, database 406 sends a reply indicating that the information has been stored (step M10). Switch 404 then sends a confirmation to terminal 402 that the information has been stored (step M11). This confirmation may be, for example, a tone or voice message.

In the depicted examples, the switch 404 will respond to calls that are terminated, whether or not the call is answered by a subscriber at terminal 402. In other words, a subscriber at recipient terminal 402 in step M3 can answer the call and the feature may still be activated in accordance with a preferred embodiment of the present invention.

For example, a subscriber seeing an incoming call via caller-ID may recognize the number and know who is placing the call before picking up the receiver to answer the call. If so, the subscriber may choose to answer the call and activate the caller-ID callback list feature of the present invention after the conversation is complete.

FIG. 4b is an exemplary message flow diagram illustrating processing a call with a caller-ID callback list feature depicted in accordance with a preferred embodiment of the present invention. In this example, in response to a caller-ID message appearing on terminal 402 display, an acknowledgement is generated from terminal 402 to switch 404 (step M12). Switch 404 requests a list of extension or telephone numbers from database 406 for the recipient, telephone 400 (step M13). Database 406 determines whether the number queried in step M13 exists in the database memory. An answer is given by database 406 to switch 404 (step M14). If the number exists in the database, the answer will be a list from which the subscriber at terminal 402 may choose a terminal to call. Alternatively, if the number does not exist in the database 406, the telephone call will be connected customarily, as if the present invention is not enabled on the user's telephone system. In a preferred embodiment, only telephone numbers that are identified by the user and are the parent of a caller-ID callback list are processed by the present invention.

Switch 404 then determines whether the directory number in the caller-ID identification information for originating terminal 400 is located in the list. Responsive to determining that the directory number for originating terminal 400 is present in the list, switch 404 returns a treatment to recipient terminal 402 (step M15). The treatment may either be a list corresponding to the number stored in the caller-ID identification information if the number exists in database 406 or customary connection of the telephone call if the number does not exist in database 406. If the extension or branch telephone number from within the central office telephone number exists in database 406, a list corresponding to the central office telephone number displayed on the caller-ID terminal display is relayed to terminal 402.

In the preferred embodiment, the list that appears, may be a subscriber defined list. From this list, the subscriber may choose from a list of names and corresponding extension or branch telephone numbers. The present invention allows the subscriber to identify a variety of groups which may place telephone calls to the user. The present invention allows the subscriber to easily choose a list in which to add the names of each subscriber defined group. Once a list is chosen, the subscriber adds names to the list and the corresponding extension or branch telephone number. Each list may include a list of names and corresponding extension or branch telephone numbers and may be displayed simultaneously, for example, in a scrollable display on terminal 402.

The subscriber further narrows down the choices to decide from who the call was placed and may select a person and corresponding extension or branch telephone number from the displayed list. After choosing a caller and corresponding extension or branch telephone number, terminal 402 places the call to switch 404 (step M16). In a preferred embodiment of the present invention, a automatic callback dial feature may be included on the terminal and once an identified caller is selected, terminal 402 may automatically dial the number selected. In an alternate embodiment, the subscriber may manually dial the number. Next, the signal is relayed from switch 404 to terminal 400 via PBX 408 (step M17). Terminal 400 answers the call from switch 404 (step M18). Switch 404 then connects to terminal 402 (step M19) and the call is completed between terminal 402 and terminal 400 (step M20). At some point in time, the call is disconnected (step M21). At that point, in response to a disconnect signal from either the originating terminal or the recipient terminal, the connection is taken down and the originating and recipient terminals are idle.

Figure 5A:
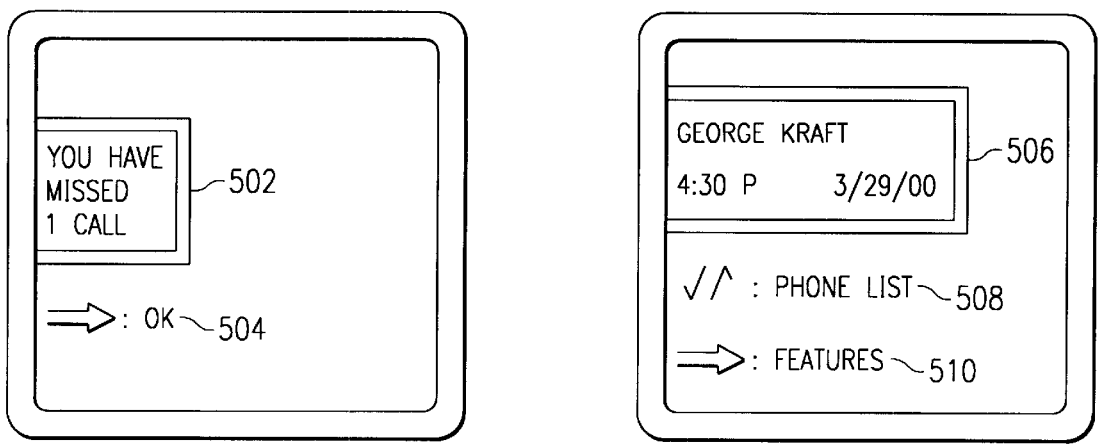
FIG. 5a, 5b, and 5c is an exemplary illustration of caller-ID callback list display options according to the present invention.
Figure 5B:
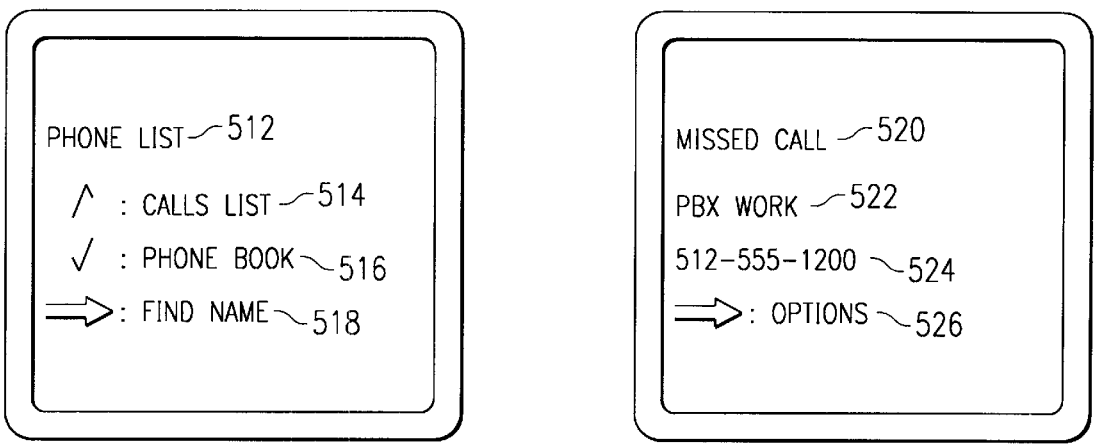
Figure 5C:
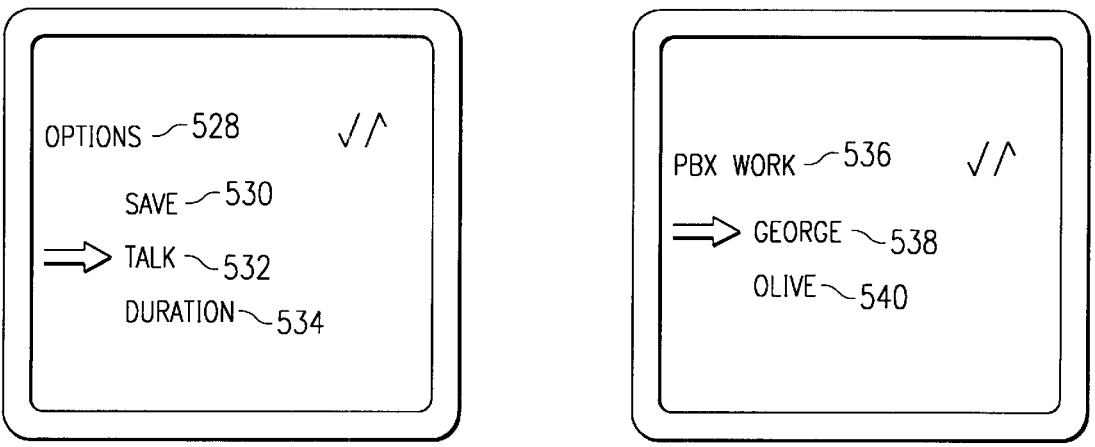

FIG. 5a, 5b, and 5c is an exemplary illustration of caller-ID callback list display options according to the present invention. In the following illustrations, the present invention displays options for caller-ID callback identification for a telephone call originating from a central office telephone number with the use of a Qualcomm™ Dual Analog Digital Mobile Telephone. However, the present invention is not limited to this particular telephone or the mobile telephone environment in general and may be implemented with other wired or wireless communication devices. For example, the present invention may be implemented by using a PCS telephone, a cordless telephone, a speaker telephone, and the like. Also, each option displayed on the communication device could be chosen by using, for example, a LCD display, a keypad, a voice prompt, voice recognition, and the like.

The particular example chosen to illustrate the features of this invention in FIG. 5a, 5b, 5c, and 6 is the identification of persons and corresponding extension or branch telephone numbers in response to a missed telephone call originating from a central office line. However, the present invention may be applied at any time. Those of ordinary skill in the art will appreciate that the caller-ID callback list feature as described below can be utilized for callers before a call is placed to the subscriber terminal, in response to a call that is answered at the subscriber terminal, and the like.

In this example, the screen of the communication device may indicate to the subscriber the number of calls that have been received but remain unacknowledged in the "Missed Call" field 502. In this example, the recipient terminal has missed one call. If there is a missed telephone call, the subscriber may select the "Ok" option 504 to further determine the identity of the originating caller and the corresponding extension or branch telephone number from which the missed call was placed.

If the subscriber selects the "Ok" option 504, the next screen that may appear is the "Caller Identification" field 506. This field may identify the caller, the time the call was placed, and the date on which the call was placed. In this example, the missed call was from "George Kraft" and was placed on Mar. 29, 2000 at 4:30 P.M. In addition, the "Caller Identification" field 506 may be configured to display system or subscriber defined information or a combination of both. In addition, a subscriber may choose caller attributes to suit the subscriber's specific needs.

The subscriber may now choose the "Phone List" option 508 or the "Features" option 510. If "Phone List" 508 is chosen, the next screen that may appear is the "Phone List" screen 512. The "Phone List" screen 512 may display several options, such as, for example, "Call List" 514, "Phone Book" 516, and "Find Name" 518. If the subscriber selects "Call List" 514, the next screen which may appear is the "Missed Call" screen 520 which may identify the location 522 and the telephone number 524 from which the missed call was placed. In this example, the missed telephone number was placed from a PBX labeled "Work" and the central office telephone number to the "Work" PBX is 512–555–1200. The "Missed Call" screen 520 may also display an "Options" selection 526 to further identify the extension or branch telephone number from which the missed call was placed.

If the subscriber selects "Options" 526, the "Options" screen 528 may appear. The "Options" screen 528 may display a "Save" option 530, a "Talk" option 532, and a "Duration" option 534. If the "Talk" option 532 is chosen, the next screen that may appear may display a list containing the name of a person previously identified by the subscriber who is associated with the organization from which the missed call originated. The displayed list may also include additional persons who have been defined by the subscriber also located at the central office telephone number from which the missed call originated.

In this example, since the number recorded on the caller-ID feature was placed from a central office telephone number, for example, "PBX Work" 536, the subscriber's terminal display may display the corresponding list of persons associated with that particular central office telephone number. In this example, the "PBX Work" list 536 is displayed and may include names 538 and 540 which have been designated by the subscriber to be included in this specific list. Of course, other displays may also be used. For example, the displayed list may include names and corresponding telephone numbers, the name of the originating caller may be highlighted, the name of the originating caller may be flashing, and the like.

In this example, the "PBX Work" list 536 contains the names "George" 538 and "Olive" 540. Since the subscriber knows the potential choices of individuals associated with the PBX number from the "Caller Identification" field 506, the subscriber may now choose a name from the displayed list "PBX Work" 536. If the subscriber chooses "George" 540, the automatic callback feature of the communication device, if the device is so equipped, may place a call to a name on the list, for example, "George" 540, using the extension or branch telephone number corresponding to "George" 540 at "Work". Of course, other methods of returning calls may also be utilized. For example, the subscriber could manually key in a telephone number, the communication device may respond to a voice prompt, and the like.

Therefore, a subscriber to the present invention, after being notified of a missed telephone call via the subscriber's terminal display, may select, if the telephone call was placed from a extension or branch telephone number within a central office line, a name and associated extension or branch telephone number from a subscriber defined list. The list may correspond to the organization and central office telephone number which is displayed via the caller-ID feature on the subscriber's terminal. Then the extension or branch telephone number can be dialed to connect the subscriber to the presumed originator of the missed telephone call.

FIG. 6 is an exemplary illustration of a caller-ID callback list according to the present invention. The subscriber may create several callback lists, each list corresponding to a central office telephone number from which the subscriber may receive calls. In this example, the subscriber has defined an "All" telephone list 600 and a "Work" telephone list 620. The "All" telephone list 600 may include identifiers of individuals known by the subscriber, such as, for example, names 602, 604, 606, 608, and 610 which the subscriber has previously defined as possible callers and their corresponding telephone numbers 603, 605, 607, 609, and 611, respectively. In this example, "George" 602, "Olive" 604, "Jordan" 606, "Meghan" 608, and "Morgan" 610 have been identified by the subscriber with their corresponding telephone numbers at which they can be reach, for example, 555–1201 603, 555–1202 605, 555–1234 607, 555–2345 609, and 555–3456 611, respectively.

In addition, the caller-ID callback "All" list 600 may also contain a entry which identifies an organization 612 and the corresponding central office telephone number 613. In this example, "Work" is included in the "All" list and the corresponding main switch number is also displayed for "Work", for example, 555–1200.

Furthermore, each entry on a caller-ID callback list may, if chosen, be an additional callback listing. If an entry on a displayed list is in itself an additional callback list, the entry may include a marker 614. The marker may indicate to the subscriber of the caller-ID callback list feature that, when such a marker is present, an additional list 620 may be displayed on the display of the terminal including a further list of names 622 and 624 and corresponding telephone numbers 623 and 625, respectively, for which a person can be reached.

In this example, since the entry "Work" 612 displays the central office telephone number, an asterisk ("*") is included next to the central office telephone number for "Work" 612. In addition, each name on a displayed list may be included on an additional list and may also be identified by an indicator, such as indicators 616 and 618. In this example, since "George" 602 and "Olive" 604 are also included in the "Work" list 620, the extension or branch telephone numbers corresponding to both "George" 602 and "Olive" 604 are shown with a plus ("+") sign.

Figure 7:
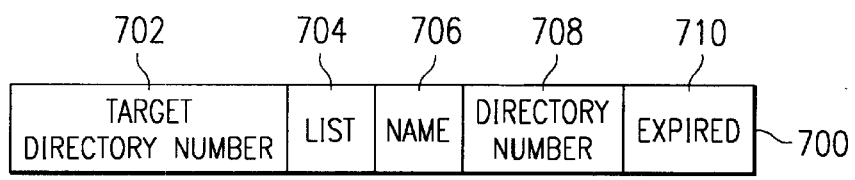
FIG. 7 is an example of entries used in a list or database for a caller-ID callback list depicted in accordance with a preferred embodiment of the present invention.

FIG. 7 is an example of entries used in a list or database for a caller-ID callback list depicted in accordance with a preferred embodiment of the present invention. In this example, entry 700 contains the originating terminal directory number in field 702, a list identified by the subscriber in 704, the name of a caller identified by the subscriber to be included in list 704 in field 706, the directory number of the caller identified by the subscriber to be included in list 704 in field 708, and an expiration date in field 710. The originating terminal directory number in field 702 is used to sort or select extension or branch telephone numbers for a list. Alternatively, field 702 may be omitted and each entry may be associated with the subscriber activating the caller-ID callback list feature. In such a case, such an entry may be associated in a linked list for the subscriber. Although an expiration date is placed in field 710, a time period also may be used. For example, some set number of days or months may be placed in field 710. Alternatively, the caller-ID extension number may be permanent or at least until the caller-ID callback list feature is cancelled.

Figure 8:
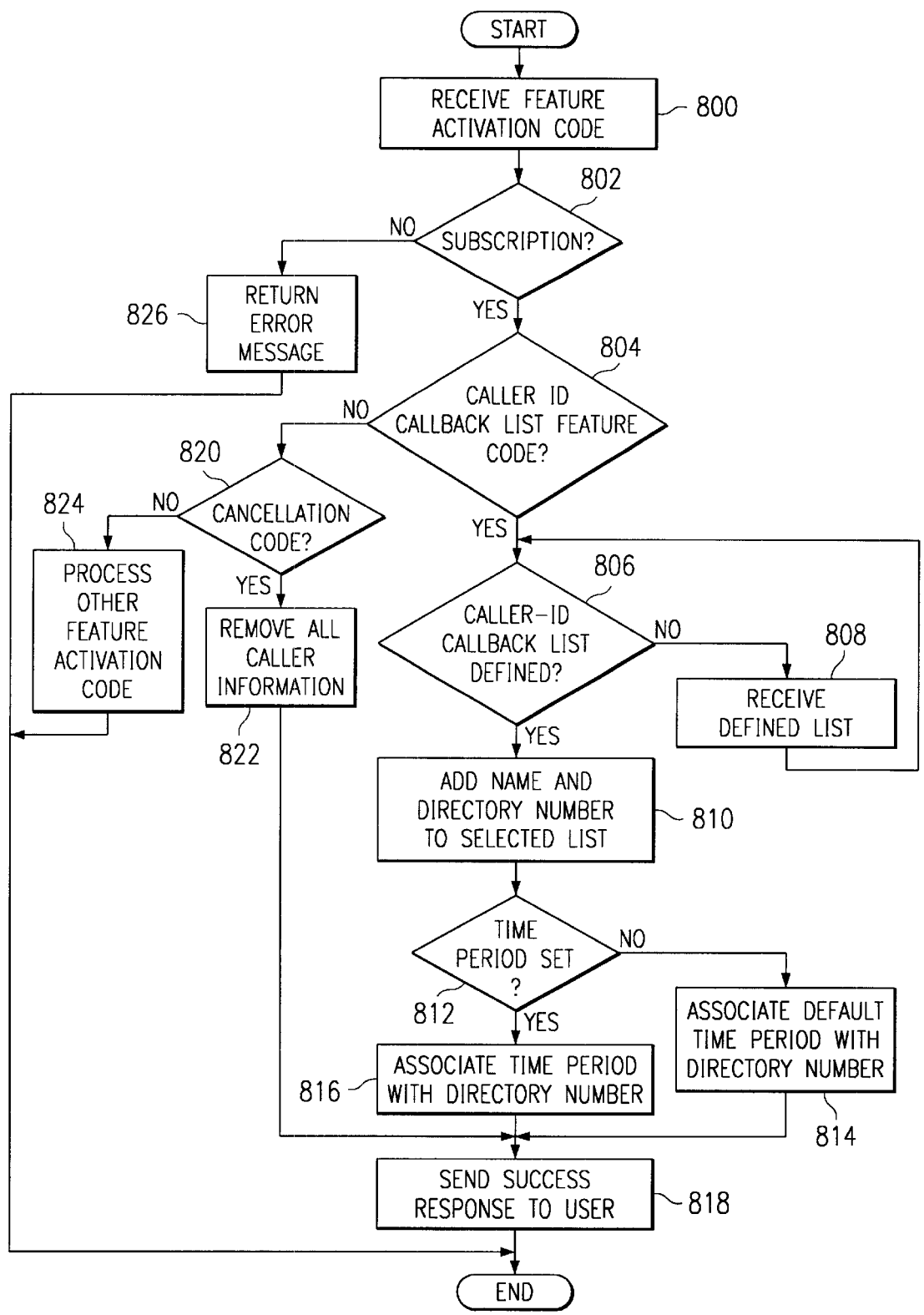
FIG. 8 is a flowchart of an exemplary operation used to provision a number for a caller-ID callback list feature depicted in accordance with a preferred embodiment of the present invention.

FIG. 8 is a flowchart of an exemplary operation used to provision a number for a caller-ID callback list feature depicted in accordance with a preferred embodiment of the present invention. In this example, the operation begins by receiving a feature activation code (step 800). A determination is then made as to whether or not the terminal has a subscription to the caller-ID callback list feature (step 802). If the terminal does not have a subscription to the caller-ID callback list feature (step 802:NO), an error indication is returned via the terminal display panel (step 826) and the operation is terminated. Otherwise, if the terminal has a subscription to the caller-ID callback list feature (step 802:YES), a determination is made as to whether or not the feature activation code is for the caller-ID callback list feature of the present invention (step 804).

If the entered feature activation code is not a code for the caller-ID callback list feature of the present invention (step 804:NO), a determination is then made if the code is one for cancellation of the feature (step 820). If the code corresponds to cancellation of the caller-ID callback list feature (step 820:YES), all organizational caller data is removed from the lists corresponding to this subscriber (step 822), a response is sent to the subscriber indicating the feature was successfully cancelled (step 818), and the operation is terminated. Alternatively, the switch could audibly present each directory number in a reject list and allow selective deletion. Otherwise, if the code received is not one for cancellation of the caller-ID callback list feature (step 820:NO), the other feature corresponding to the feature code received is processed (step 824) and the operation is terminated.

Returning to step 804, if the code received is one for the caller-ID callback list feature of the present invention (step 804:YES), a determination is made as to whether or not the appropriate callback list has been defined (step 806). If an appropriate list has not been defined by the subscriber (step 806:NO), a defined list is received (step 808) and the operation returns to step 806. Otherwise, if the appropriate list has been defined (step 806:YES), a name and corresponding extension or branch telephone number is added to the chosen list (step 810).

Then a determination is made as to whether or not the received feature activation code sets a time period (step 812). A time period may be set during which a call from an identified organizational extension or branch telephone number is desired by the user. This time period may be temporary or permanent. If a time period is not set by the feature activation code (step 812:NO), the time period may be a default time period associated with the directory extension or branch telephone number in the list (step 814). Thereafter, a success response is sent to the subscriber via the terminal (step 818) with the operation terminating thereafter. Otherwise, if a time period has been set by the feature activation code (step 812:YES), the time period set is associated with the identified directory extension or branch telephone number in the list (step 816). Thereafter, a success response is sent to the subscriber via the subscriber terminal (step 818) and the operation is terminated. A success response may be, for example, a tone or a voice message.

Figure 9:
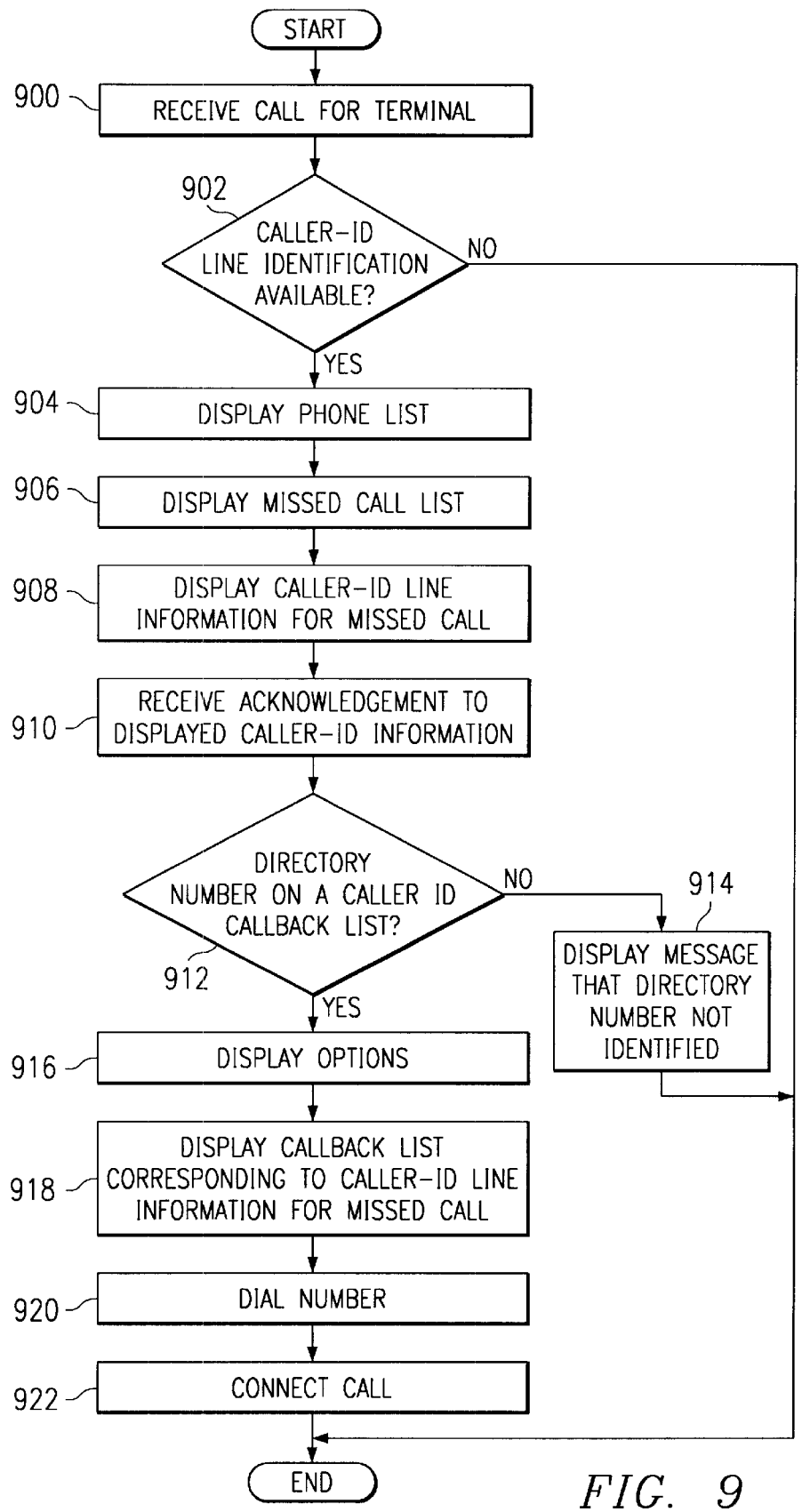
FIG. 9 is a flowchart outlining an exemplary operation for performing the caller-ID callback list display method according to the present invention.

FIG. 9 is a flowchart outlining an exemplary operation for performing the caller-ID callback list display method according to the present invention. In this example, the operation begins by receiving a call for a subscriber terminal (step 900). A determination is made as to whether caller-ID identification information is available for the call (step 902). If caller-ID identification is not available (step 902:NO), the operation is terminated. Otherwise, if caller-ID identification information is available (step 902:YES), a "Phone List" screen may be displayed (step 904). Next, a "Missed Calls" list may be displayed (step 906). Following this, caller-ID identification information for the missed call may be displayed (step 908). Then an acknowledgement may be received in response to the displayed caller-ID information (step 910).

A determination is then made if the identified caller is included in a caller-ID callback list (step 912). If the caller is not identified in a list (step 912:NO), a message is displayed indicating that the directory extension or branch telephone number is not identified and stored in the database (step 914), and then the operation is terminated. Otherwise, if the caller is included in a list (step 912:YES), display options may be displayed to further identify the telephone extension or branch telephone number from which the missed call was placed (step 916).

Next, a caller-ID callback list corresponding to the caller-ID identification line information for the missed call may be displayed (step 918). The device may now use its automatic callback feature or the user may manually enter the number for the originator of the missed call (step 920). The call is connected (step 922) and the operation is terminated in response to a disconnect signal from either the originating terminal or the recipient terminal.

Figure 10:
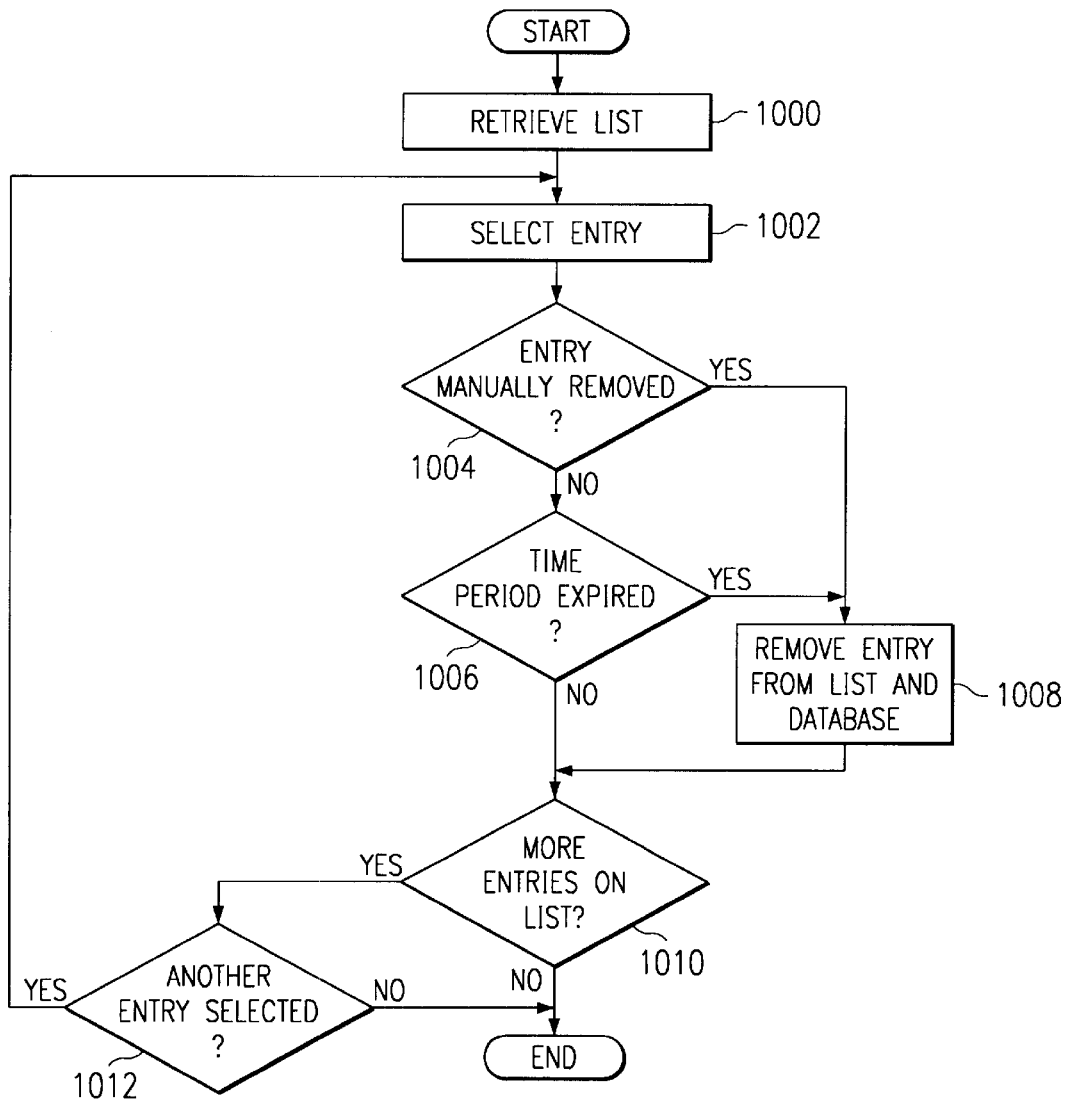
FIG. 10 is a flowchart of an exemplary operation for removing caller information from a caller-ID callback list depicted in accordance with a preferred embodiment of the present invention.

FIG. 10 is a flowchart of an exemplary operation for removing directory numbers from a caller-ID callback list depicted in accordance with a preferred embodiment of the present invention. In this example, the operation begins by retrieving the caller-ID callback list for a particular directory extension or branch telephone number (step 1000). An entry is selected from the list (step 1002). A determination is made as to whether the name and corresponding extension or branch telephone number have been manually removed by the subscriber (step 1004). If the number has been manually removed (step 1004:YES), the name and corresponding directory number are removed from all lists and the database (step 1008). Otherwise, if the directory number has not been manually removed (step 1004:NO), a determination is made as to whether a time period for the unprocessed entry has expired (step 1006). Typically, the entry will contain a period of time after which the directory number should no longer be needed. Also, it is possible that the entry is permanent and will not expire.

If the time period has expired (step 1006:YES), the entry is removed from all lists and the database (step 1008). Otherwise, if the time period has not expired (step 1006:NO), or after an entry is manually removed from the list and the database (step 1008), a determination is then made as to whether more unprocessed entries are present for processing (step 1010). If no more entries are on the list (step 1010:NO), the operation terminates. Otherwise, if more entries are present (step 1010:YES), a determination is made whether another entry has been selected (step 1012). If another entry has not been selected (step 1012:NO), the operation terminates. Otherwise, if another entry has been selected (step 1012:YES), the operation returns to step 1002 to select another entry for processing.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for establishing caller identification callback lists comprising:

receiving caller line identification information for an originating terminal at a recipient terminal;

retrieving, from a set of caller identification callback lists, a caller identification callback list associated with the caller line identification information, wherein additional calling information is associated with each of the set of possible callers in the caller identification callback list;

allowing one of the set of possible callers to be selected for callback at the recipient terminal; and placing a call using the additional calling information associated with the one of the set of possible callers such that the call is directed to the one of the set of possible callers.

2. The method of claim 1, wherein allowing the one of the set of possible callers to be selected includes:
displaying the set of possible callers on a display as a scrollable list.

3. The method of claim 2, wherein the scrollable list includes an organizational identifier.

4. The method of claim 1, further comprising:
in response to at least one of the set of possible callers being associated with at least one additional set of possible callers, displaying at least one symbol in association with the at least one set of possible callers to denote that the at least one of the set of possible callers is also associated with the at least one additional set of possible callers.

5. The method of claim 1, wherein placing the call includes use of at least one of an automatic call return feature and manual entry of a telephone number at the recipient terminal.

6. The method of claim 5, wherein manual entry of the telephone number at the recipient terminal includes at least one of keying in digits and entering the telephone number via voice input.

7. The method of claim 1, further comprising:
displaying the caller line identification information for the originating terminal on a display linked to the recipient terminal.

8. The method of claim 1, wherein the recipient terminal is at least one of a wire-connected communication crevice and a wireless communication device.

9. The method of claim 1, wherein the caller information identifying the set of possible callers is stored in at least one of the recipient terminal and a storage device located remotely from the recipient terminal.

10. The method of claim 1, wherein the caller information identifying the set of possible callers stores at least one of a name identifier and a telephone number.

11. The method of claim 1, wherein the caller information identifying the set of possible callers includes selected caller data that is stored in the caller identification callback list for a temporary period of time.

12. The method of claim 1, further comprising:
receiving an identification of a caller associated with the caller line identification information;
receiving additional calling information associated with the caller; and
storing the additional calling information associated with the caller along with the identification of the caller in the caller identification callback list such that the caller is made a member of the set of possible callers.

13. The method of claim 12, further comprising:
generating an audible sound in response to storing the additional calling information associated with the caller along with the identification of the caller in the caller identification callback list such that the caller is made a member of the set of possible callers.

14. The method of claim 1, further comprising:
receiving a listing instruction from the recipient terminal, wherein the listing instruction includes an identification of a selected caller identification callback list from the set of caller identification callback lists;
receiving a time period instruction designating a duration for which selected caller data is to be contained within the selected caller identification callback list; and
indicating on a display associated with the recipient terminal that the selected caller data has been added to the selected caller identification callback list.

15. The method of claim 1, wherein the additional calling information associated with the one of the set of possible callers includes at least one of an extension and a branch number.

16. The method of claim 1, wherein placing the call includes using the additional calling information associated with the one of the set of possible callers in conjunction with the caller line identification information.

17. A computer program product in a computer readable medium for establishing caller identification callback lists comprising:
first instructions for receiving caller line identification information for an originating terminal at a recipient terminal;
second instructions for retrieving, from a set of caller identification callback lists, a caller identification callback list associated with the caller line identification information, wherein additional calling information is associated with each of the set of possible callers in the caller identification callback list;
third instructions for allowing one of the set of possible callers to be selected for callback at the recipient terminal; and
fourth instructions for placing a call using the additional calling information associated with the one of the set of possible callers such that the call is directed to the one of the set of possible callers.

18. The computer program product of claim 17, wherein allowing the one of the set of possible callers to be selected includes:
displaying the set of possible callers on a display as a scrollable list.

19. The computer program product of claim 18, wherein the scrollable list includes an organizational identifier.

20. The computer program product of claim 17, further comprising:
fifth instructions for, in response to at least one of the set of possible callers being associated with at least one additional set of possible callers, displaying at least one symbol in association with the at least one set of possible callers to denote that the at least one of the set of possible callers is also associated with the at least one additional set of possible callers.

21. The computer program product of claim 17, wherein placing the call includes use of at least one of an automatic call return feature and manual entry of a telephone number at the recipient terminal.

22. The computer program product of claim 21, wherein manual entry of the telephone number at the recipient terminal includes at least one of keying in digits and entering the telephone number via voice input.

23. The computer program product of claim 17, further comprising:
fifth instructions for displaying the caller line identification information for the originating terminal on a display linked to the recipient terminal.

24. The computer program product of claim 17, wherein the recipient terminal is at least one of a wire-connected communication device and a wireless communication device.

25. The computer program product of claim 17, wherein the caller information identifying the set of possible callers is stored in at least one of the recipient terminal and a storage device located remotely from the recipient terminal.

26. The computer program product of claim 17, wherein the caller information identifying the set of possible callers stores at least one of a name identifier and a telephone number.

27. The computer program product of claim 17, wherein the caller information identifying the set of possible callers includes selected caller data that is stored in the caller identification callback list for a temporary period of time.

28. The computer program product of claim 17, further comprising:
fifth instructions for receiving an identification of a caller associated with the caller line identification information;
sixth instructions for receiving additional calling information associated with the caller; and
seventh instructions for storing the additional calling information associated with the caller along with the identification of the caller in the caller identification callback list such that the caller is made a member of the set of possible callers.

29. The computer program product of claim 28, further comprising:
eighth instructions for generating an audible sound in response to storing the additional calling information associated with the caller along with the identification of the caller in the caller identification callback list such that the caller is made a member of the set of possible callers.

30. The computer program product of claim 17, further comprising:
fifth instructions for receiving a listing instruction from the recipient terminal, wherein the listing instruction includes an identification of a selected caller identification callback list from the set of caller identification callback lists;
sixth instructions for receiving a time period instruction designating a durator for which selected caller data is to be contained within the selected caller identification callback list; and
seventh instructions for indicating on a display associated with the recipient terminal that the selected caller data has been added to the selected caller identification callback list.

31. The computer program product claim 17, wherein the additional calling information associated with the one of the set of possible callers includes at least one of an extension and a branch number.

32. The computer program product of claim 17, wherein placing the call includes using the additional calling information associated with the one of the set of possible callers in conjunction with the caller line identification information.

33. A communications system for establishing caller identification call back lists comprising:
a communications network;
a recipient terminal connected to the communications network, the recipient terminal including at least one user input device;
an originating terminal connected to the communications network; and
at least one storage device in communication with the recipient terminal,
wherein the recipient terminal receives caller line identification information associated with the originating terminal,
the recipient terminal retrieves, from a set of caller identification callback lists stored in the at least one storage device, a caller identification callback list associated with the caller line identification information, wherein additional calling information is associated with each of the set of possible callers in the caller identification callback list;
the recipient terminal allows one of the set of possible callers to be selected for callback via the at least one user input device; and
the recipient terminal placing a call through the communications network using the additional calling information associated with the one of the set of possible callers such that the call is directed to the one of the set of possible callers.

34. The communications system of claim 33, wherein allowing the one of the set of possible callers to be selected includes:
displaying the set of possible callers on a display as a scrollable list on a user output device associated with the recipient terminal.

35. The communications system of claim 34, wherein the scrollable list includes an organizational identifier.

36. The communications system of claim 33, wherein in response to at least one of the set of possible callers being associated with at least one additional set of possible callers, a user output device associated with the recipient terminal displays at least one symbol in association with the at least one set of possible callers to denote that the at least one of the set of possible callers is also associated with the at least one additional set of possible callers.

37. The communications system of claim 33, wherein placing the call includes use of at least one of an automatic call return feature and manual entry of a telephone number at the recipient terminal.

38. The communications system of claim 37, wherein manual entry of the telephone number at the recipient terminal includes at least one of keying in digits and entering the telephone number via voice input.

39. The communications system of claim 33, wherein a user output device associated with the recipient terminal displays the caller line identification information for the originating terminal.

40. The communications system of claim 33, wherein the communications network includes at least one of a wireless network and a physically connected network.

41. The communications system of claim 33, wherein the at least one storage device includes at least one of a storage device physically associated with the recipient terminal and a storage device located remotely from the recipient terminal.

42. The communications system of claim 33, wherein the caller information identifying the set of possible callers stores at least one of a name identifier and a telephone number.

43. The communications system of claim 33, wherein the caller information identifying the set of possible callers includes selected caller data that is stored in the caller identification callback list for a temporary period of time.

44. The communications system of claim 33, wherein
the recipient terminal receives, via the at least one user input device, an identification of a caller associated with the caller line identification information;
the recipient terminal receives, via the at least one user input device, additional calling information associated with the caller; and
the recipient terminal directs the at least one storage device to store the additional calling information associated with the caller along with the identification of the caller in the caller identification callback list such that the caller is made a member of the set of possible callers.

45. The communications system of claim 44, further comprising:

a sound-producing component, wherein the sound-producing component generates an audible sound in response to the recipient terminal's storing the additional calling information associated with the caller along with the identification of the caller in the caller identification callback list such that the caller is made a member of the set of possible callers.

46. The communications system of claim 33, wherein the recipient terminal receives, via the at least one user input device, a listing instruction, wherein the listing instruction includes an identification of a selected caller identification callback list from the set of caller identification callback lists;

the recipient terminal receives, via the at least one user input device, a time period instruction designating a duration for which selected caller data is to be contained within the selected caller identification callback list; and the recipient terminal directs a user output device associated with the recipient terminal that the selected caller data has been added to the selected caller identification callback list.

47. The communications system of claim 33, wherein the additional calling information associated with the one of the set of possible callers includes at least one of an extension and a branch number.

48. The communications system of claim 33, wherein placing the call includes using the additional calling information associated with the one of the set of possible callers in conjunction with the caller line identification information.

* * * * *

UNITED STATES PATENT AND TRADEMARK OFFICE
CERTIFICATE OF CORRECTION

PATENT NO. : 6,542,591 B1
DATED : April 1, 2003
INVENTOR(S) : Amro et al.

It is certified that error appears in the above-identified patent and that said Letters Patent is hereby corrected as shown below:

Column 13,
Line 32, after "communication", device "crevice" and insert -- device --.

Column 15,
Line 37, after "designating a", delete "durator" and insert -- duration --.

Signed and Sealed this

Sixteenth Day of March, 2004

JON W. DUDAS
*Acting Director of the United States Patent and Trademark Office*